United States Patent Office 2,859,244
Patented Nov. 4, 1958

2,859,244
RESOLUTION OF DL-LYSINE WITH D-CAMPHORIC ACID

Halbert C. White, Midland, Mich., assignor to The Dow Chemical Company, Midland, Mich., a corporation of Delaware No Drawing. Application September 28, 1956
Serial No. 612,572

4 Claims. (Cl. 260—534)

This invention concerns the resolution of DL-lysine. More particularly, it concerns a method of reacting DL-lysine with camphoric acid, whereby di-L-lysine·D-camphorate is formed, and isolating and decomposing said salt to recover L-lysine and D-camphoric acid, which acid can be reused.

Lysine is one of the essential amino acids. It occurs in various proteins as L-lysine, the isomer which can be metabolized by humans. D-lysine, a component of the DL-lysine which is obtained by synthetic means, cannot be utilized as an amino acid. It is desirable that L-lysine be separable and recoverable from its racemate so that foods deficient in L-lysine can be fortified and upgraded therewith.

In accordance with this invention, it has now been discovered that L-lysine can be separated and recovered from racemic lysine as the salt di-L-lysine·D-camphorate by co-reacting in an aqueous medium proportions between 0.2 and 0.35 mole of D-camphoric acid, preferably between 0.275 and 0.3 mole, per mole of DL-lysine. The di-L-lysine·D-camphorate is precipitated from the reaction medium with a lower monohydric alcohol, i. e., one having no more than 3 carbon atoms, and decomposed to give an L-lysine product and a by-product D-camphoric acid which can be recycled for re-use.

In practice the di-L-lysine·D-camphorate can be decomposed in various ways. For example, its aqueous solution can be decomposed with concentrated hydrochloric or equivalent acid, and L-lysine·HCl, for example, is recovered from such solution after removal of the D-camphoric acid therefrom. For instance, the D-camphoric acid can be fractionally crystallized and separated from the aqueous solution of L-lysine·HCl, the resulting aqueous solution neutralized with concentrated ammonium hydroxide to a pH of about 5, and the L-lysine·HCl precipitated by adding to the resulting aqueous solution a lower monohydric alcohol, and the L-lysine·HCl recovered therefrom. Alternatively, the L-lysine·HCl can be precipitated with acetone. Again, an aqueous solution of the di-L-lysine·D-camphorate can be decomposed by passage through a column of cation exchanging resin and replacing and eluting the absorbed L-lysine with dilute ammonium hydroxide. The by-product D-lysine can be racemized and recycled. The order of addition of the alcohol to precipitate the L-lysine·D-camphorate is not important, i. e., the requisite amount may be added with one or both of the reactants or may be added after reaction.

Temperature of reaction between lysine and D-camphoric acid is not critical, and may range between 0° C. and reflux temperature. Higher proportions of D-camphoric acid than 0.35 mole per mole of DL-lysine are wasteful of D-camphoric acid, and interfere with good resolution of the lysine isomers, while lower proportions of D-camphoric acid than 0.2 mole per mole of DL-lysine are wasteful of lysine. Advantageously, proportions by weight between 60 and 95 parts of lower monohydric alcohol to 40 to 5 parts of water are used to precipitate the di-L-lysine·D-camphorate and the L-lysine hydrochloride from their aqueous reaction media.

It has previously been believed that 0.5 mole of D-camphoric acid per mole of DL-lysine was necessary to effect a separation of the L- from the D-isomer as the di-L-lysine·D-camphorate, and that a plurality of fractional crystallizations was necessary to get a good isomer separation. By the process of this invention, utilizing a proportion of 0.2 to 0.35 mole of D-camphoric acid per mole of DL-lysine, crystallization of di-L-lysine·D-camphorate is carried out with ease and rapidity to give a very granular salt. One fractional crystallization suffices, yet the yields of L-lysine approximate 80 percent, DL-lysine basis.

The following examples represent specific embodiments of this invention and the advantages accruing therefrom.

Example 1

A quantity of 38 ml. of aqueous solution containing 29.2 g. (0.2 mole) of DL-lysine was reacted at room temperature with 12 g. (0.06 mole) of D-camphoric acid, and 150 ml. of methanol was then added. After seeding with the di-L-lysine salt of D-camphoric acid, $(\alpha)_D^{25} +16.5°$ in water, and stirring for 2 hours at room temperature, the very granular crystals resulting were filtered and washed with methanol to give 29.0 g. of di-L-lysine·D-camphorate, $(\alpha)_D^{25} +12.7°$, corresponding to 78 percent of L-lysine. Recrystallization of 10 g. of said salt from 12 ml. water and then 40 ml. methanol gave 7.0 g. of the salt, $(\alpha)_D^{25} +16.1°$, corresponding to 98 percent lysine. The overall yield was 80.8 percent of the original L-lysine content of the racemic lysine.

A quantity of 12.3 g. of the di-L-lysine·D-camphorate (0.025 mole) was dissolved in 13 ml. of hot water and 5 ml. (0.06 mole) of concentrated hydrochloric acid was added. After cooling the resulting solution in an ice bath for 1 hour, 4.8 g. of D-camphoric acid (96 percent of theory) was collected by filtration. The filtrate was neutralized to a pH of 4.5 with 0.5 ml. of concentrated ammonium hydroxide and 150 ml. of ethanol was added. After 2 hours, the solids were collected by filtration to give 8.7 g. of L-lysine·HCl (95 percent of theory), assaying 98 percent L-lysine. The overall yield of L-lysine was 78 percent of the lysine in the racemic lysine.

Example 2

A quantity of 38 ml. of an aqueous solution containing 0.20 g. mole of DL-lysine was diluted with 100 ml. of methanol and then 12 g. (0.06 mole) of D-camphoric acid dissolved in 50 ml. of methanol was added. A few seeds of the di-L-lysine salt of D-camphoric acid were added and after two hours' stirring at room temperature, 29.4 g. of salt was obtained, $(\alpha)_D^{25} +11.9°$, corresponding to 73 percent L-lysine by assay. The overall recovery of the original L-lysine content was 88 percent.

By-product D-lysine can be racemized and the resulting DL-lysine can be resolved, pursuant to the process of this invention. The following example illustrates the racemization of D-lysine.

Example 3

A quantity of 125 ml. of an aqueous D-lysine solution (0.485 mole mixture of 80 percent D-lysine and 20 percent L-lysine) and 170 ml. of 5 N sodium hydroxide (0.85 mole) was heated at 170–180° C./140–150 p. s. i. g. pressure for two hours. The caustic soda solution was then poured through a column of nuclearly sulfonated styrene-divinylbenzene copolymer in the acid form (1.75 moles). The column was eluted with dilute NH$_4$OH solution and washed with deionized water. The eluate and wash were combined and concentrated to give a 97 percent recovery of DL-lysine, assaying 53.3 percent D-isomer by specific rotation.

The DL-lysine so obtained can be resolved pursuant to the procedure of this invention, as previously indicated. It is apparent, therefore that D-lysine per se and in DL-lysine can ultimately be converted to L-lysine, and the L-lysine recovered by a practice of this invention.

What is claimed is:

1. A method for recovering L-lysine from DL-lysine which comprises reacting in an aqueous medium proportions between 0.2 and 0.35 mole of D-camphoric acid with one mole of DL-lysine, precipitating di-L-lysine·D-camphorate therefrom with a monohydric alcohol having no more than 3 carbon atoms, separating the di-L-lysine·D-camphorate from the precipitation medium, and decomposing and recovering L-lysine therefrom.

2. The method of claim 1 wherein the by-product D-lysine is racemized and recycled.

3. A method for recovering L-lysine from DL-lysine which comprises reacting in aqueous medium proportions between 0.2 and 0.35 mole of D-camphoric acid with one mole of DL-lysine, precipitating di-L-lysine·D-camphorate therefrom with a monohydric alcohol having no more than 3 carbon atoms, separating di-L-lysine·D-camphorate from the precipitation medium, dissolving said camphorate in water, decomposing said aqueous solution of said camphorate with concentrated hydrochloric acid, crystallizing and separating D-camphoric acid from the resulting solution, neutralizing such solution to a pH of about 5, and precipitating L-lysine hydrochloride therefrom with a monohydric alcohol having no more than 3 carbon atoms, the proportions by weight of said monohydric alcohol to water in both precipitation steps ranging between 60 and 95 parts of alcohol to 40 to 5 parts of water.

4. The method of claim 3 wherein methanol is used to precipitate the di-L-lysine·D-camphorate.

References Cited in the file of this patent

UNITED STATES PATENTS

| | | |
|---|---|---|
| 2,536,360 | Emmick et al. | Jan. 2, 1951 |
| 2,556,907 | Emmick | June 12, 1951 |
| 2,579,283 | Vines | Dec. 18, 1951 |
| 2,586,154 | Emmick | Feb. 19, 1952 |
| 2,657,230 | Rogers | Oct. 27, 1953 |

OTHER REFERENCES

Berg: J. Biol. Chem., vol. 115 (1936), pp. 9–15.